United States Patent [19]

Neveux

[11] 4,127,838

[45] Nov. 28, 1978

[54] FITTING OF A HEAT-SENSITIVE CAPSULE IN A WALL OF A WATER CHAMBER OR THE LIKE

[75] Inventor: René E. Neveux, Les Clayes-sous-Bois, France

[73] Assignee: Societe Anonyme Francaise du Ferodo, Paris, France

[21] Appl. No.: 739,824

[22] Filed: Nov. 8, 1976

[30] Foreign Application Priority Data

Nov. 10, 1975 [FR] France .................. 75 34298

[51] Int. Cl.² .......................................... H01H 37/04
[52] U.S. Cl. .................................... 337/380; 337/112
[58] Field of Search ............... 337/380, 381, 112, 113, 337/34, 121, 186, 327, 398, 414

[56] References Cited

U.S. PATENT DOCUMENTS

| | | | |
|---|---|---|---|
| 3,171,933 | 3/1965 | Webb et al. | 337/380 |
| 3,234,350 | 2/1966 | Johnson et al. | 337/380 |
| 3,529,272 | 9/1970 | Johnson et al. | 337/380 |
| 3,581,263 | 5/1971 | Moro | 337/380 |
| 3,786,463 | 1/1974 | Peltz et al. | 337/380 |
| 3,893,057 | 7/1975 | Beunk et al. | 337/380 |

*Primary Examiner*—Harold Broome
*Attorney, Agent, or Firm*—Wigman & Cohen

[57] ABSTRACT

The assembly of an enclosure containing a fluid, and a capsule comprising a casing which contains a heat-sensitive element, the capsule being mounted in a wall of the enclosure through a mounting arrangement comprising a metal part forming one end of the casing and engaging the heat-sensitive element, a seat formed in the wall and having a bottom provided with an opening which opens into the interior of the enclosure, a lateral orifice which opens to the outside, and an inner surface having an annular zone between the opening and the orifice, and means for inserting and holding the capsule inside the seat to seal the opening by urging the metal part towards the annular zone with the possible interposition of a seal.

10 Claims, 4 Drawing Figures

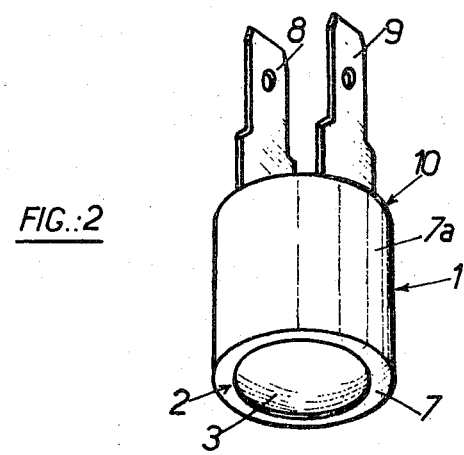
FIG.:2
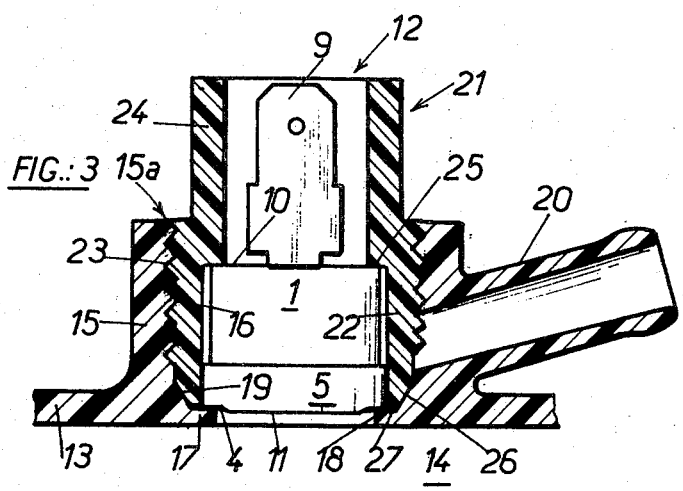
FIG.:3
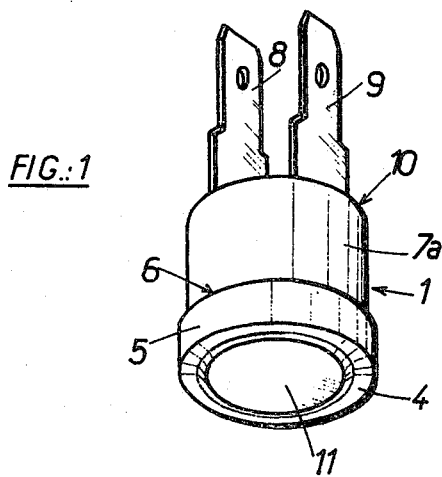
FIG.:1

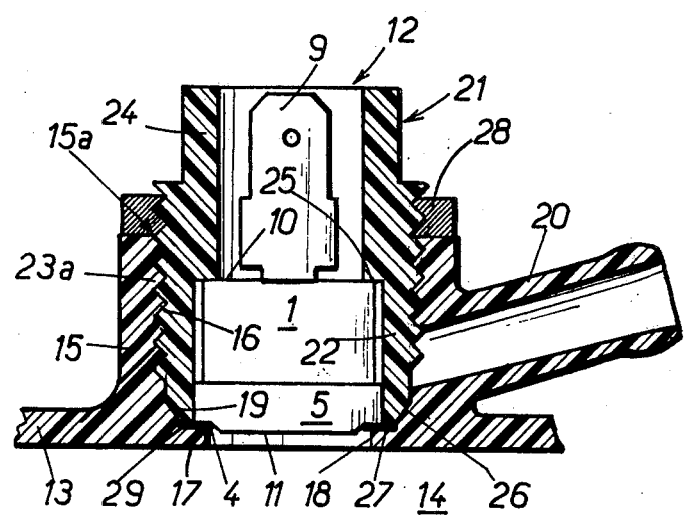
FIG.:4

FITTING OF A HEAT-SENSITIVE CAPSULE IN A WALL OF A WATER CHAMBER OR THE LIKE

The invention relates to heat-sensitive capsules, in particular thermo-contact capsules, and concerns more precisely improvements associated with the fitting of such a capsule in a wall of an enclosure containing a fluid, in particular a water chamber of a motor vehicle radiator.

A heat-sensitive capsule is in the form of a casing containing a heat-sensitive element, for example wax or oil, which expands under the effect of the heat to actuate a thermostatic mechanism or indicate a temperature. The heat-sensitive element may be a bimetallic disc contained at one end of the casing and deflecting under the effect of the heat to make and break a contact between two conductors connected to lugs emerging from the casing, this capsule being an example of a thermo-contact. Such capsules are currently used in the water chambers of radiators for cooling the engines of motor vehicles, for example in order to start and stop, according to the temperature of the water, a fan serving to accelerate the stream of air traversing the radiator.

The fitting of a thermo-contact capsule or other heat-sensitive capsule in a water-chamber wall must ensure both the water-tightness of the wall and the transmission of the heat between the water contained in the water chamber and the bimetallic disc or other heat-sensitive element. The capsule is generally fitted in a seat formed in the wall of the water chamber. In a first known constructional form, this seat opens into the water chamber and the capsule is inserted in a threaded metal plug, for example of brass, which ensures the transmission of the heat. This plug is provided with a flange or collar which is applied in a water-tight manner against the outer edge of the seat when the plug is screwed into it. In other constructional forms, the bottom of the seat is closed by a thin metal wall which ensures both water-tightness and the transmission of the heat.

An object of the present invention is to provide means for fitting heat-sensitive capsule in a wall of an enclosure containing fluid while opening up communication at will between the enclosure and the outside, so that the capsule can be used, for example, for emptying the enclosure or for filling it with fluid. A further object of the invention is the provision of an arrangement for fitting a heat-sensitive capsule in a water chamber of a motor vehicle radiator, the arrangement being such that the capsule can be used as a drain tap.

To this end, as in the first known constructional form described briefly hereinbefore, there are provided a seat which opens into the interior of the enclosure, a metal surface forming one end of the casing and placed in contact with the heat-sensitive element, for example the bimetallic disc, and means for inserting and holding the capsule inside the seat in such manner as to close it in a water-tight manner, and, according to the invention, these means ensure water-tightness by urging this metal surface, with the possible interposition of a seal, towards an adjacent zone of the inner surface of the seat, and the seat is provided, between its inlet and the said zone, with an orifice opening to the outside. It is thus possible to open the enclosure towards the outside by loosening the device which urges the metal surface towards the adjacent zone of the inner surface of the seat.

In the case of a thermo-contact capsule, the metal surface which forms the end of the casing may be constituted by a threaded plug into which the capsule is inserted, in accordance with the known arrangement recalled hereinbefore, but preferably a more economic solution will be adopted consisting in using a capsule of a type which is likewise known and the end of which is closed by a metal plate which holds the bimetallic disc and the edge of which is clasped or closed around the wall of the casing. In an embodiment, the inner surface of the seat comprises, opposite the clasped or turned over edge of the plate, a tapered zone, preferably frustoconical, against which is engaged a tapered end portion, of complementary form, of a socket in which the capsule is engaged and which is inserted in the seat together with the latter so that this end portion forms a seal by being clamped between the said tapered zone and the said clasped edge. Preferably, the socket is provided internally with a shoulder which bears on the casing of the capsule and externally with a thread which is screwed into an internal thread of the seat; the socket is made advantageously of synthetic resin.

It is appropriate to observe that the method of fitting according to the invention applies both to a wall of synthetic resin and to a metal wall.

The description which follows with reference to the accompanying drawing and given by way of non-limitative example will make it clearly understood how the invention may be carried into effect.

FIG. 1 is a perspective view of a thermo-contact cell of known type, the end of which is closed by a metal plate;

FIG. 2 is a view similar to FIG. 1 showing the position of the bimetallic disc in the cell, the metal plate being assumed to have been removed;

FIG. 3 shows a preferred embodiment, according to the invention, of the fitting of the cell of FIG. 1;

FIG. 4 is a view similar to FIG. 3, showing a modification.

The conventional capsule shown in FIGS. 1 and 2 comprises a cylindrical casing 1 of insulating material, of which the lower end 2, which is bottomless, contains a bimetallic disc 3 (FIG. 2) held in place by a circular metal plate 4 (FIG. 1) which closes the end 2 and the edge 5 of which is turned over upwardly and clasped or closed at 6 around the outer surface 7a of the cylindrical wall 7 of the casing. The bimetallic disc 3 is convex towards the outside at ordinary temperature. When its temperature exceeds a given value, it suddenly changes its position of equilibrium and becomes convex towards the inside, so making and breaking a contact between two conductors (not visible) respectively connected to two lugs 8, 9 which emerge from the casing through the upper end 10 thereof. The plate 4 is in contact with the peripheral portion of the bimetallic disc 3 so as to hold this in the casing 1; the central portion 11 of the plate is stamped so as to form a slight projection towards the outside and thus form towards the inside of the casing a seat into which the bimetallic disc 3 fits when it is convex towards the outside.

This capsule is intended to be fixed in a wall of a water chamber of a motor vehicle radiator (not shown) in order to start and stop a fan (not shown either) the electric circuit of which is connected to the lugs 8, 9 according to whether the temperature of the water is higher or lower than the given temperature.

FIG. 3 illustrates the fitting of the capsule, which is designated as a whole by the reference 12. There can be seen at 13 a wall of a water chamber made of synthetic resin, the interior of the water chamber being located at 14. The wall 13 is provided with a hollow cylindrical boss 15 projecting on the outside of the water chamber and the hollow interior of which forms a seat threaded at 16 moulded integrally with the boss and the remainder of the wall 13. The wall 13 is extended inside the hollow base to form at the base thereof a bottom 17 in which there is a central opening 18. Between the internal thread 16 and the bottom 17, the inner surface of the seat comprises a tapered frustoconical zone 19, that is to say a frustoconical zone having its small base on the bottom 17. The boss 15 is provided with a lateral projection 20 forming a nozzle, likewise moulded integrally, which opens at one end into the tapped seat, just above the frustoconical zone 19, that is to say between this zone and the inlet 15a of the seat, and at the other end outside the water chamber 14.

The capsule 12 is fitted into the seat formed by the threaded hollow of the boss 15 by means of a socket 21 of synthetic resin. The socket 21 comprises a cylindrical lower portion 22 threaded externally at 23 and a narrower upper portion 24, the outer surface of which forms a hexagon and the cylindrical inner surface of which is connected by a shoulder 25 to the cylindrical inner surface of the lower portion 22. The end of the lower portion 22 is tapered at 26 in the form of a truncated cone complementary to the truncated cone formed by the zone 19. The socket 21 has dimensions such that the hollow interior of the portion 22 can receive the casing 1 of the capsule 12 with its plate 4 and that, when the end 10 of the casing 1 bears against the shoulder 25, the plate 4 projects beyond the rim 27 of the portion 22 by a few millimeters. This portion 22 has a thickness such that when the socket 21 is fully engaged in the boss 15 in the position shown, that is to say until the periphery of the plate 4 comes into contact with the annular zone of the bottom 17, the end portion tapered at 26 is strongly compressed between the zone 19 and the clasped or turned-over edge 5 of the plate, thus ensuring water-tightness around the plate.

In order to fit the capsule 12 in the wall 13, the capsule is engaged from below, in the position shown, in the interior of the socket 21 and the thread 23 of the latter is screwed into the internal thread 16 of the seat. When the screw connection is very tight, the tapered end portion 26 of the socket is compressed as has been explained hereinbefore, so that the plate 4 cuts off communication between the opening 18 and the outside in a water-tight manner. The metal plate 4, which is in contact with the peripheral portion of the bimetallic disc, as has been seen, transmits to the latter, at the same time as it holds it in place, the temperature of the water contained in the water chamber at 14.

If the boss 15 is located, for example, at a point of the water chamber, it is sufficient to unscrew the socket 21 a little in order to establish communication between the opening 18 and the nozzle 20 around the tapered end 26 of the socket, so as to empty the water chamber.

In the embodiment shown, the thread 23 does not extend beyond the internal thread 16 when the socket 21 is screwed home. In another embodiment, the thread extends beyond the internal thread, which enables the socket to be checked by means of a lock nut, as shown in FIG. 4. In this figure is shown a locknut 28 screwed on thread 23a which extends beyond tapping 16. FIG. 4 also shows an annular seal 29 which is clamped between metal plate 4 and the annular zone of bottom 17.

It is obvious that the embodiments described are only examples and that it would be possible to modify them, in particular by substituting technical equivalents, without thereby departing from the scope of the invention as defined in the claims. In particular, the socket could be plain and be fitted in its seat by means of a nut screwed onto an outer thread of the boss and provided with an inner rim. The casing is not compulsorily cylindrical over its entire height, but its lower portion formed by the metal surface is preferably of revolution.

I claim:
1. System comprising an enclosure having a wall; fluid contained in the enclosure; a seat formed in said wall and having a bottom; and opening in said bottom, which communicates with the interior of said enclosure; orifice means open to the atmosphere which includes a port in the seat, extending laterally to the seat, said seat having an inner surface forming an annular zone between said opening and said port; a capsule comprising a casing, a heat-sensitive element in the casing, and a metal part forming one end of said casing and engaging said heat-sensitive element; and releasable means for inserting and holding the capsule inside the seat with said metal part engaging said annular zone to releasably seal said opening.

2. (Amended) System according to claim 1, wherein said annular zone comprises a tapered zone, comprising a socket having an end portion of form complementary to said tapered zone, the capsule being contained in the socket, and said releasable means comprising means for applying said end portion against said tapered zone to clamp said end portion between said tapered zone and said casing.

3. System according to claim 2, wherein said tapered zone and said end portion are frustoconical.

4. System according to claim 2, wherein the socket is provided internally with a shoulder and said means urge said shoulder against the casing.

5. System according to claim 2, wherein said releasable means comprise an internal thread formed in the inner surface of the seat, and a complementary thread formed on the outer surface of the socket.

6. System comprising an enclosure having a wall; a fluid in the enclosure; a seat formed in said wall and having a bottom; an opening in said bottom, which opens into the interior of said enclosure; orifice means which opens to atmosphere and which has a port in the seat, extending laterally to the seat; an inner surface of the seat, having an annular zone between said opening and said port; a capsule comprising a casing, a heat-sensitive element in the casing, and a metal part forming one end of said casing and engaging said heat-sensitive element; an annular seal for sealing said capsule; and releasable means for inserting and holding the capsule inside the seat with said annular seal clamped between said metal part and said annular zone to seal said opening releasably.

7. (Amended) System according to claim 6, wherein said annular zone comprises a tapered zone, comprising a socket having an end portion of form complementary to said tapered zone, the capsule being contained in the socket, and said releasable means comprising means for applying said end portion against said tapered zone to clamp said end portion between said tapered zone and said casing.

8. System according to claim 7, wherein the socket is provided internally with a shoulder and said means urge said shoulder against the casing.

9. System according to claim 7, wherein said releasable means comprise an internal thread formed in the inner surface of the seat, and a complementary thread formed on the outer surface of the socket.

10. System according to claim 7, wherein said tapered zone and said end portion are frustoconical.

* * * * *

UNITED STATES PATENT AND TRADEMARK OFFICE
CERTIFICATE OF CORRECTION

PATENT NO. : 4,127,838

DATED : November 28, 1978

INVENTOR(S) : Rene E. Neveux

It is certified that error appears in the above-identified patent and that said Letters Patent are hereby corrected as shown below:

Column 4, line 52, delete "(Amended)".

Signed and Sealed this

Twenty-sixth Day of June 1979

[SEAL]

Attest:

RUTH C. MASON
Attesting Officer

DONALD W. BANNER
Commissioner of Patents and Trademarks